(12) United States Patent
Auriol et al.

(10) Patent No.: US 7,972,089 B2
(45) Date of Patent: Jul. 5, 2011

(54) DEVICE FOR ENABLING THE DISPLACEMENT OF PARTS INSIDE A CONDUIT

(75) Inventors: Jean-Marc Auriol, Flourens (FR); Philippe Bornes, Flourens (FR)

(73) Assignee: F2 C2 System, Flourens (FR)

( * ) Notice: Subject to any disclaimer, the term of this patent is extended or adjusted under 35 U.S.C. 154(b) by 778 days.

(21) Appl. No.: 11/569,582

(22) PCT Filed: May 27, 2005

(86) PCT No.: PCT/FR2005/050383
§ 371 (c)(1),
(2), (4) Date: Jan. 23, 2007

(87) PCT Pub. No.: WO2005/118216
PCT Pub. Date: Dec. 15, 2005

(65) Prior Publication Data
US 2009/0159474 A1    Jun. 25, 2009

(30) Foreign Application Priority Data

May 27, 2004    (FR) ...................................... 04 05699

(51) Int. Cl.
*B65G 51/22*    (2006.01)
(52) U.S. Cl. .............................. 406/192; 406/49; 406/87
(58) Field of Classification Search .................. 406/49, 406/87, 192, 193, 195; 141/67, 68
See application file for complete search history.

(56) References Cited

U.S. PATENT DOCUMENTS

| | | | | |
|---|---|---|---|---|
| 1,823,056 | A | * | 9/1931 | Marburg .......................... 406/10 |
| 2,607,635 | A | * | 8/1952 | Kollgaard ....................... 406/174 |
| 2,679,990 | A | * | 6/1954 | Mathzeit et al. .................. 406/4 |
| 2,709,555 | A | * | 5/1955 | Schroder ....................... 406/192 |
| 2,781,232 | A | * | 2/1957 | Smith ........................... 406/105 |

(Continued)

FOREIGN PATENT DOCUMENTS

| | | |
|---|---|---|
| DE | 42 19 190 C | 7/1993 |
| DE | 299 14 956 U | 1/2000 |
| JP | 60 040320 A | 3/1985 |

OTHER PUBLICATIONS

International Search Report, Sep. 26, 2005, from International Phase of the instant application.

(Continued)

*Primary Examiner* — Joe Dillon, Jr.
(74) *Attorney, Agent, or Firm* — Jackson Patent Law Office (57) ABSTRACT

Disclosed is a system of displacing a plurality of parts to be stocked and distributed, each part defining a first end and a second end. The system comprises a conduit, the conduit defining an interior to house an actuation fluid, an axis of displacement in the interior, and an interior surface; and a plurality of devices. Each device includes a periphery configured to contact the interior surface of the conduit and to move along the interior surface, a device first surface approximately perpendicular to the axis of displacement, the device first surface being subject to a pressure of the actuation fluid thereby subjecting the device to displacement in the conduit, a first device-end shaped to receive the first end of a corresponding first part in the plurality of parts, and a second device-end shaped to receive the second end of a corresponding second part in the plurality of parts. The second device-end defines a recess including a bottom surface intersected by the axis of displacement, the recess being configured to center the corresponding second part in the conduit. The device is positioned between the corresponding first part and the corresponding second part in the conduit.

8 Claims, 4 Drawing Sheets

U.S. PATENT DOCUMENTS

| | | | | |
|---|---|---|---|---|
| 3,840,274 | A | * | 10/1974 | Williams et al. ................. 406/19 |
| 3,888,433 | A | * | 6/1975 | Fish .............................. 406/184 |
| 4,026,606 | A | * | 5/1977 | Williams ....................... 406/193 |
| 4,135,685 | A | * | 1/1979 | Girshovich et al. ............. 406/10 |
| 4,165,845 | A | * | 8/1979 | Carstens et al. ............. 406/192 |
| 4,239,420 | A | * | 12/1980 | Thibonnier et al. .............. 406/2 |
| 4,240,768 | A | * | 12/1980 | Carstens ......................... 406/19 |
| 4,242,038 | A | * | 12/1980 | Santini et al. ................. 414/755 |
| 4,506,865 | A | * | 3/1985 | Bragin et al. ................. 251/366 |
| 4,856,941 | A | * | 8/1989 | Morimoto et al. ............. 406/85 |
| 4,904,127 | A | * | 2/1990 | Morimoto et al. ............. 406/50 |
| 5,056,962 | A | * | 10/1991 | Morimoto et al. ............. 406/49 |
| 5,149,229 | A | * | 9/1992 | Gericke et al. ................. 406/75 |
| 5,211,514 | A | * | 5/1993 | Morimoto et al. ............ 406/186 |
| 5,568,755 | A | * | 10/1996 | Mendenhall .................... 83/402 |
| 6,227,770 | B1 | * | 5/2001 | Poncelet et al. .............. 406/195 |
| 6,367,396 | B1 | * | 4/2002 | Meyer ........................... 111/176 |
| 6,398,007 | B1 | * | 6/2002 | Yamada ........................ 198/399 |
| 6,443,671 | B1 | * | 9/2002 | Weiste .......................... 406/195 |
| 7,347,649 | B2 | * | 3/2008 | Duerr et al. ..................... 406/49 |

OTHER PUBLICATIONS

English Translation of the Written Opinion of the International Search Authority, Dec. 4, 2006, from International Phase of the instant application.

English Translation of International Preliminary Report on Patentability Chapter I, Dec. 4, 2006, from International Phase of the instant application.

* cited by examiner

DEVICE FOR ENABLING THE DISPLACEMENT OF PARTS INSIDE A CONDUIT

FIELD OF THE INVENTION

The present invention relates to the field of storage and of distribution of small hardware parts, such as rivets, in the interior of a conduit and to adaptations enabling realization of their displacement under optimal conditions.

DESCRIPTION OF THE PRIOR ART

The storage and distribution of small hardware parts are carried out in the prior art by several types of devices, including storage and distribution devices for fastening elements, such as rivets, that are composed of one or several tubes in the interior of which the rivets can move, with or without the aid of the action of a fluid.

This type of device offers numerous advantages including:
  the stored parts are protected from shocks avoiding possible deteriorations of geometry or surface state,
  the grooved tube enables the actuation fluid, i.e. most often compressed air, to arrive at the first part and to actuate it with very little pressure,
  the parts are stored pre-oriented in the tube
  the times for waiting and for reorientation of the parts are eliminated,
  the bulkiness and the mass of such a means of storage and distribution are less substantial than that of a device such as a vibrating bowl.

It is nevertheless difficult to assure with the aid of such a device the storage and the distribution of parts that do not offer abutment surface for the fluid flux and guiding surfaces capable of cooperating with the hollow core of the tube.

In fact, in the absence of a surface approximately flat and perpendicular to the axis of the tube, the part will have difficulties moving in the interior of the tube under the action of the pressurized fluid. It will also encounter difficulties if it does not have guiding surfaces to avoid its jamming in the interior of the tube.

BRIEF DESCRIPTION OF THE INVENTION

Noting this, the applicants conducted research studies aiming to offer a device capable of enabling the storage and the distribution of any parts in the interior of tubes in which circulates an actuation fluid, despite their lack of abutment surface for the aforementioned fluid and despite the possible absence of guiding surface.

These technical difficulties are solved by the device of the invention enabling the displacement of a part in the interior of which circulates an actuation fluid and that is characterized in that it is constituted by a body that, when combined with each part, on the one hand has at least one portion of its periphery that comes into contact for guiding with the interior surface of the conduit inside of which the parts must move, and on the other hand has as least one surface approximately perpendicular to the axis of displacement in the interior of the conduit for the purpose of abutment for the displacement fluid.

This feature is particularly advantageous because it allows any small hardware part to benefit from the advantages of a means for storing and distribution that were up to now closed to it. This is made possible by the combination of each part with a body that adopts the functional surfaces necessary to the storage and the distribution from a tube. Thus, whatever the profile and the volume of the parts to be stored and to be distributed, the device of the invention enables this function because it consolidates the features necessary to this function, namely guiding and abutment surfaces for the actuation fluid. This device also serves to separate between two parts in the interior of the storage and distribution conduit.

The combination of each part with a body can be carried out under different forms.

According to a particularly advantageous feature of the invention, at least one end of the body is preformed to receive an end of the part to be displaced. According to another particularly advantageous feature of the invention, at least one end of the body is preformed to receive and to be coupled to an end of the part to be displaced.

Furthermore, the body is preformed at an end to receive and to center the second part with which it is in contact in the conduit as a result of its separation function, i.e. in the area of its second end.

These features are particularly advantageous in that they permit contemplation of displacement of parts not offering a surface capable of providing an abutment for the displacement fluid.

In fact by forming an independent kinematic ensemble the device and the part have all the features necessary for a favorable displacement by offering an abutment surface for the fluid and avoiding overlapping of the parts between themselves.

The combination of a device with each part induces a coupling operation between the two before their insertion in the interior of the conduit. Also, in accordance with the invention, an attachment or combination operation between a part and a device is carried out before their insertion in the conduit.

This device differs from the aforesaid separator in that it offers a true coupling with the part and not a simple spacing means between two parts. Furthermore, the coupling of the device with each part enables maintaining the part, to be stored and distributed, centered with respect to the sliding path defined by the conduit.

According to another particularly advantageous feature of the invention, the preformation is carried out in the device for the purpose of receiving and coupling with the part to be displaced in a manner to obtain a tight adjustment between the part and the device.

Another object of the invention is constituted by the optimization of the capacity of the device to offer the largest possible surface capable of being subject to the action of the displacement fluid.

In order to do this, the applicants advantageously invented a device characterized in that it offers at least a modification of cross-section on its periphery thus creating a shoulder, the surface of which is capable of being subject to the pressure of the displacement fluid. Thus, the body of the device adopts one or several shoulders or exterior edges capable of augmenting the surface of the device subject to the pressure of the displacement fluid.

The fundamental concepts of the invention have just been explained above in their most elementary form. Other details and features will reemerge more clearly at the reading of the description that follows with regard to the annexed drawings giving, by way of non-limiting example, several implementation modes of a device in accordance with the invention.

DESCRIPTION OF THE PREFERRED IMPLEMENTATION MODES

Figure 1:
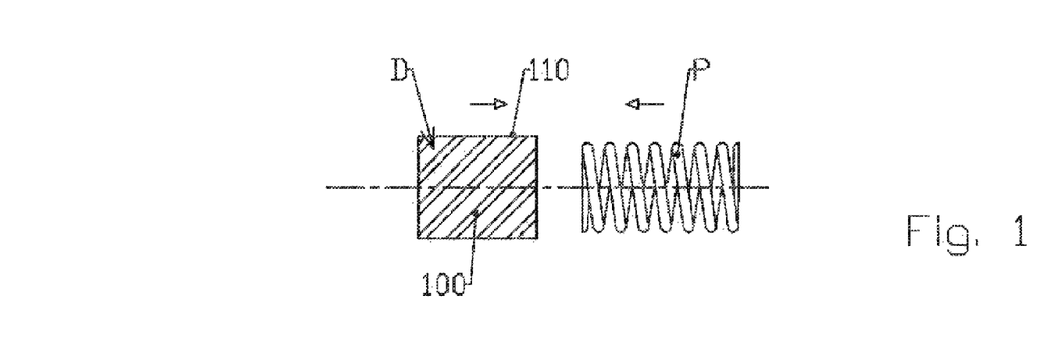
FIG. 1 is a detailed schematic cross-sectional drawing of an implementation mode of a device in accordance with the invention.
Figure 1A:
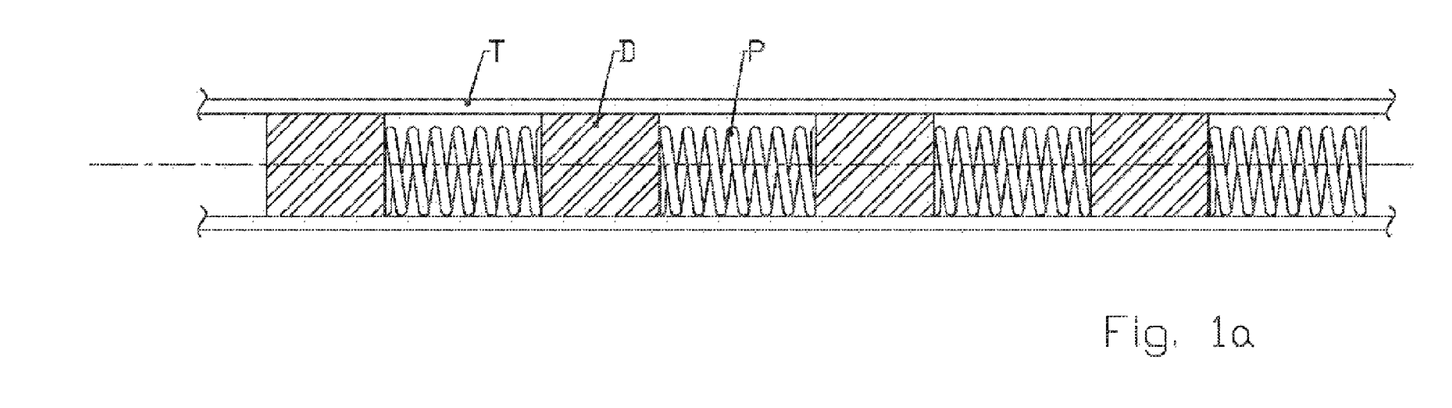
FIG. 1a is a schematic cross-sectional view drawing of a conduit in which circulate the device and the part illustrated in FIG. 1.

As illustrated in the drawings of FIGS. 1 and 1a, the part P to be stored and distributed is a compression spring that, although having a cylindrical shape, does not have sufficient flat surfaces for an efficient action of a transport fluid to enable its displacement in the interior of the conduit, constituted here by a tube T. In accordance with the invention, to solve this difficulty and allow parts such as springs the advantages not only of the storage and distribution mode by tube but also of displacement by means of a fluid, the applicants conceived a device D to be combined with each part P to be stored and displaced.

As illustrated, the springs P lie on the bottom of the conduit T. Thus, in this implementation mode, the device D functions to provide an abutment surface for the actuation fluid (constituted here by the bottom of the cylinder formed by the body 100 of the device) and to avoid the overlapping of the parts P by serving as a separator.

Figure 2:
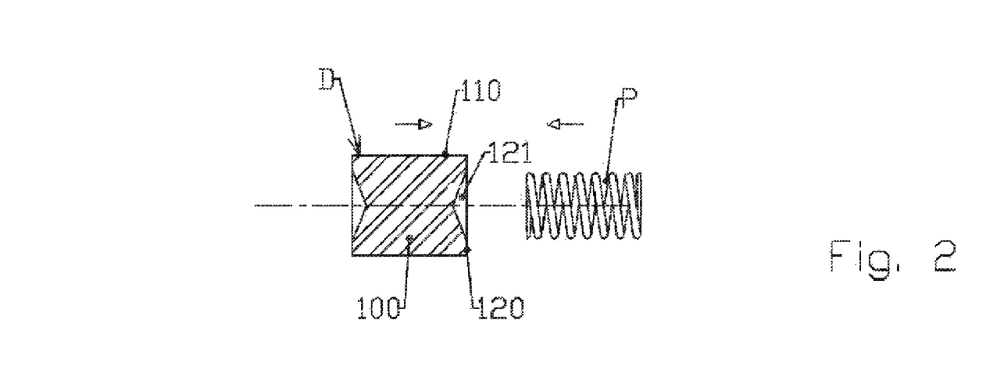
FIG. 2 is a detailed schematic cross-sectional drawing of another implementation mode of a device in accordance with the invention before its combination with a part to be displaced.
Figure 2A:
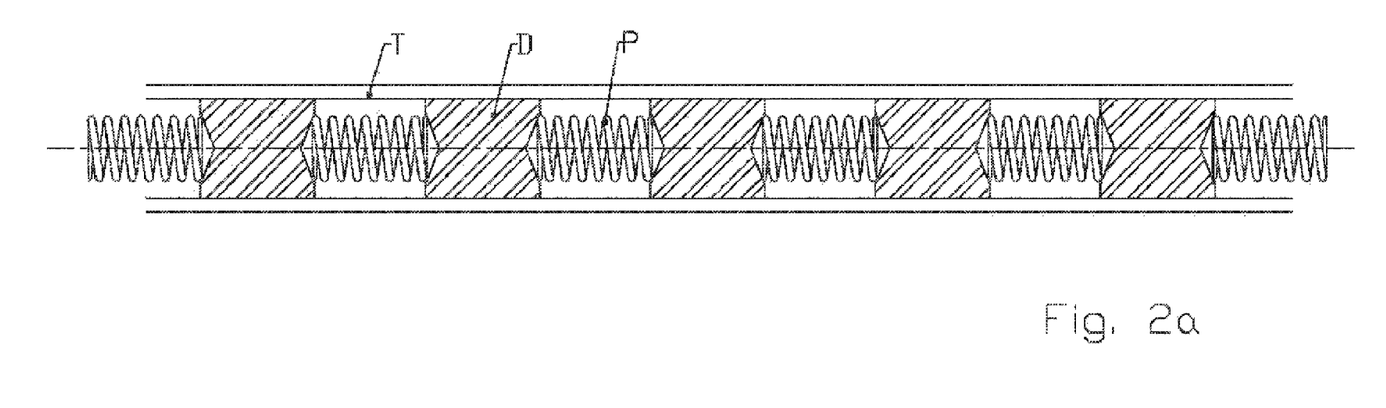
FIG. 2a is a schematic cross-sectional side view drawing of a conduit in which circulate the device and the part illustrated in FIG. 2.

According to the implementation mode illustrated by the drawings of FIGS. 2 and 2a, the ends of the body 100 of the device D are preformed to center the spring with the axis of the tube in which they must circulate. The device then assures the functions of abutment surface for the actuation fluid, of guiding surface, and of separator. This device D is characterized in that it is constituted by a body 100, at least one part of the periphery 110 of which comes into contact with the interior surface 200 of the conduit T, inside of which the parts P must move, and at least one end 120 of which is preformed for receiving an end of the part P to be moved.

According to the illustrated implementation mode, the body 100 of the device D includes, in the area of its end 120, a recessed zone 121 that receives the end of the part P, which is here a compression spring.

As illustrated, the recessed zone 121 is centered in relation to the axis of the device D so that the spring does not come into contact with the interior surface 200 of the conduit T, thus avoiding friction. Thus, according to the invention, the device receives the part P to center it in relation to the axis of the conduit and avoid as far as possible its contact with the interior surface of the conduit.

According to the illustrated implementation mode, the conduit T includes a hollow core having a circular cross-section. Consequently, in this implementation mode, the device D includes an external surface 110 that totally follows this profile and of which the dimensions enable gliding of the device in the interior of the conduit. Nevertheless, the cross-section of the conduit can adopt any profile (polygonal, oblong, etc, . . . ) to which the exterior surface 110 of the device D is adapted, in accordance with the invention.

The implementation modes described below illustrate an application with blind rivets.

Figures 3, 3A:
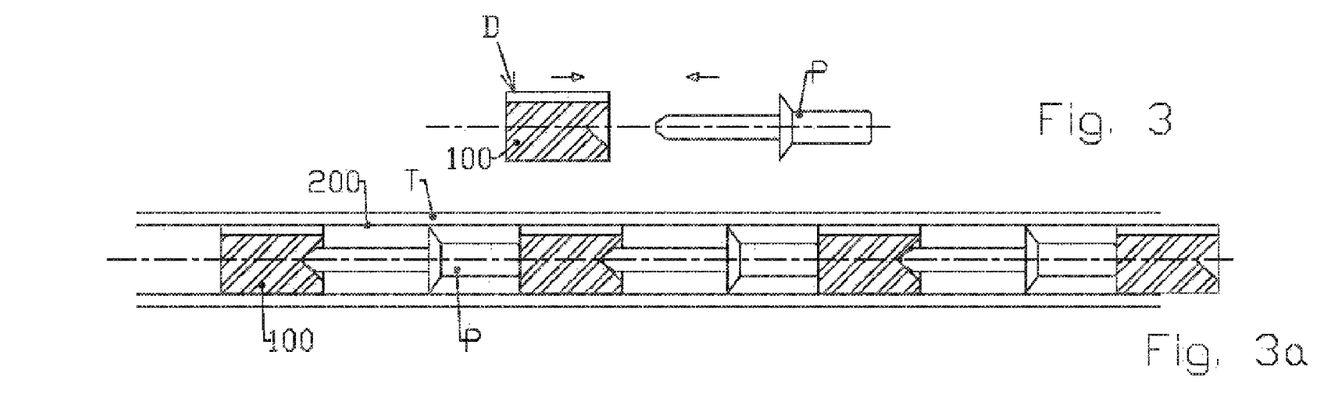
FIG. 3 is a detailed schematic cross-sectional drawing of another implementation mode of a device in accordance with the invention before its combination with a part to be displaced.
FIG. 3a is a schematic cross-sectional side view drawing of a conduit in which circulate the device and the part illustrated in FIG. 3.

As illustrated on the drawings of FIGS. 3 and 3a, the body 100 of the device D is preformed at an end 120 so that it can center the end of a blind rivet P with which it is coupled, in a manner to maintain the latter in a coaxial position with the tube or conduit T.

According to a non illustrated implementation mode, this preformation includes a cylindrical hole coaxial with the axis of the cylinder formed by the device D having a corresponding diameter adapted to receive the slender end of the blind rivet P. Thus, each rivet P to be distributed is combined with a separation device D, each combination becoming an independent kinematic sub-assembly, moving concurrently in the interior of the tube T, in particular when the rivet P is tightly mounted in the device D.

Figure 4:
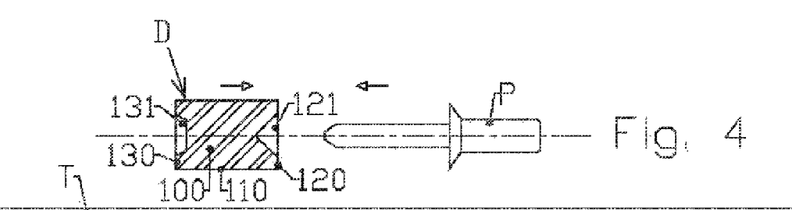
FIG. 4 is a detailed schematic cross-sectional drawing of another implementation mode of a device in accordance with the invention before its combination with a part to be displaced.
Figure 4A:
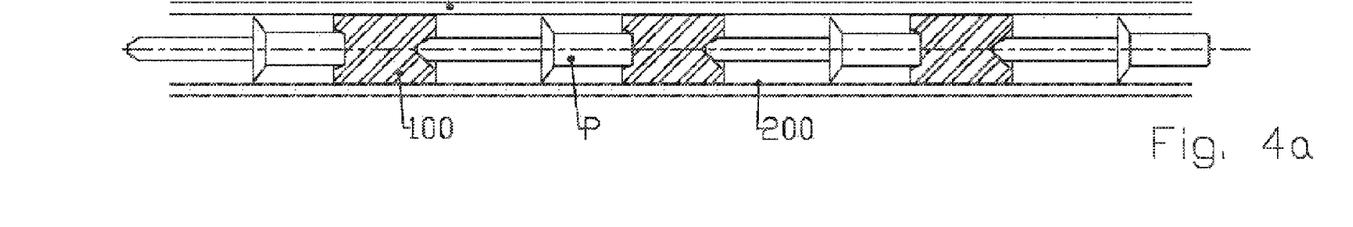
FIG. 4a is a schematic cross-sectional side view drawing of a conduit in which circulate the device and the part illustrated in FIG. 4.

According to another feature of the invention and as illustrated by the drawings of FIGS. 4 and 4a, the device D is also preformed at an end, here its second end 130, to receive and to center the second part, here the second rivet P with which it is in contact as a result of its separating function. This second preformation 131 is slightly different in this application intended for blind rivets, as a result of the dissymmetry inherent to their function. Thus, according to the illustrated implementation mode, the preformation 131 adopted by the second end 130 of the body 100 of the device D is constituted by a tapered, hollowed out recess shape.

The alignment or the optimization of the positioning of the ends of the rivets P arranged on each side of the separating devices D guarantees a good positioning of the aforementioned rivets and therefore facilitates their displacement. Nevertheless, when a tight mounting is intended, the device D is fixed only to a single part P. In fact, the coupling between the second end 130 of the device and the second end of the part P is not active except when these ends come into contact. The kinematic subassemblies formed by the combination of a device with a part are not kinematically coupled although the transverse movement impressed to a subassembly can, with the aid of the devices, be impressed to the others.

Figure 5:
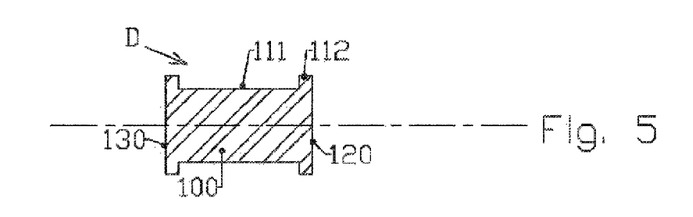
FIG. 5 is a detailed schematic cross-sectional drawing of another implementation mode of a device in accordance with the invention.
Figures 5A, 6:
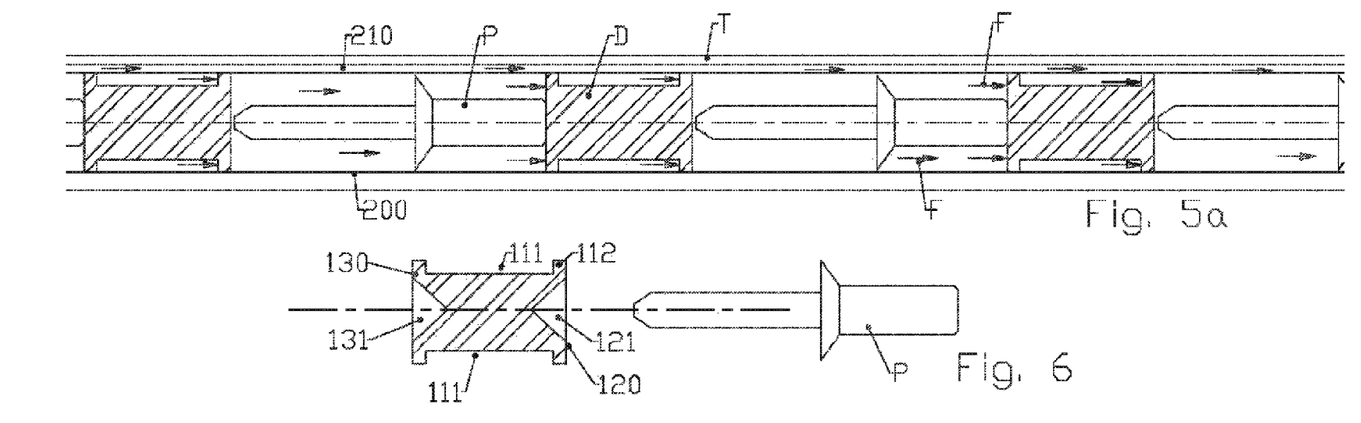
FIG. 5a is a schematic cross-sectional side view drawing of a conduit in which circulate the device and the part illustrated in FIG. 5.
FIG. 6 is a detailed schematic cross-sectional drawing of another implementation mode of a device in accordance with the invention before its combination with a part to be displaced.

In order to optimize the effect of the pressurized fluid (for example of compressed air) on the devices D, the applicants advantageously invented a device D such as that represented in FIGS. 5 and 5a. This device is particularly advantageous in that it includes on its exterior surface 110 at least a modification of cross-section 111 to form a shoulder 112 thus augmenting the surface of the device D subject to the pressure of the displacement fluid symbolized by the arrows F. This shoulder 112 is all the more useful given that the device can be used in a tube T, the hollow core or inner surface 200 of which is grooved such as that illustrated in FIG. 5a, groove 210 that facilitates the passage of the pressurized air (arrow F) up to the shoulder 112. Of course, the number of shoulders can be greater.

Another solution enabling the facilitation of the displacement of the actuation fluid through the totality of the conduit in order to be able to act on the totality of the devices D and thus of the parts can be implemented by a particularly advantageous feature of the device of the invention. Thus, according to this feature illustrated in FIGS. 3 and 3a, the device D is characterized in that its body has recesses traversing it longitudinally so that the actuation fluid circulating in the interior of the conduit can traverse it. These recesses can appear as illustrated, in the form of one or several longitudinal straight, or non-straight, grooves laid out on the peripheral surface 110 of the body 100 as well as in the form of orifices longitudinally transversing in the body. This feature prevents, in the absence of grooves made in the hollow core of the conduit T, the body 100 from becoming an excessively large obstacle to the displacement of the fluid and therefore of the parts.

Figure 6A:
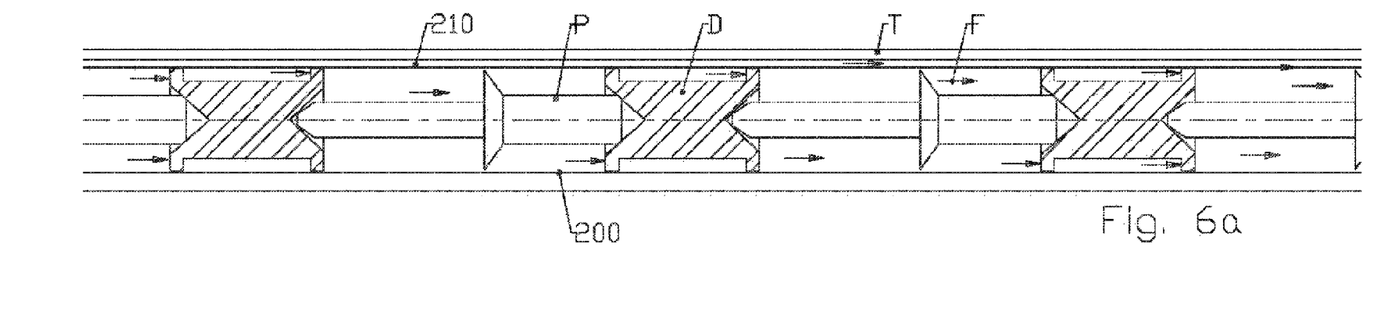
FIG. 6a is a schematic cross-sectional side view drawing of a conduit in which circulate the device and the part illustrated in FIG. 6.

An implementation mode uses the entirety of the designed features, such as the device D illustrated by FIGS. 6 and 6a, of which the body 100 adopts:
- an exterior shape 110 adapted to the inner profile of the conduit T in which it is intended that it moves and with the inner surface 200 of which it is in contact,
- a first end 120 preformed to receive and center a first end of a part P to be stored and distributed such as a rivet,
- a second end 130 preformed to receive and center the second end of another part P to be stored and distributed,
- one or several shoulders 112 or exterior edges capable of augmenting the surface subject to the pressure of the displacement fluid.

As illustrated, in this implementation mode, the ends 120 and 130 of the body 100 of the device D adopt the same preformation.

One understands that the device, that has just been described and represented above, was in view of a disclosure rather then a limitation. Of course, various arrangements, modifications and improvements can be applied to the examples described above, without departing from the framework of the invention as defined in the claims.

The invention claimed is:

1. A system of displacing a plurality of parts to be stocked and distributed, each part defining a first end and a second end, the system comprising:
   a conduit, the conduit defining an interior to house an actuation fluid, an axis of displacement in the interior, and an interior surface; and
   a plurality of devices, each device including
      a periphery configured to contact the interior surface of the conduit and to move along the interior surface,
      a device first surface approximately perpendicular to the axis of displacement, the device first surface being subject to a pressure of the actuation fluid thereby subjecting the device to displacement in the conduit,
      a first device-end shaped to receive the first end of a corresponding first part in the plurality of parts, and
      a second device-end shaped to receive the second end of a corresponding second part in the plurality of parts, the second device-end defining a recess including a bottom surface intersected by the axis of displacement, the recess being configured to center the corresponding second part in the conduit, whereby the device is positioned between the corresponding first part and the corresponding second part in the conduit
   wherein
      the device includes a section having a first diameter, the device first surface has a diameter greater than the first diameter, thus augmenting the portion of the device subject to the pressure of the actuation fluid, and
      the conduit defines grooves that facilitate passage of the actuation fluid up to the device first surface.

2. A system of displacing a plurality of parts to be stocked and distributed, each part defining a first end and a second end, the system comprising:
   a conduit, the conduit defining an interior to house an actuation fluid, an axis of displacement in the interior, and an interior surface; and
   a plurality of devices, each device including
      a periphery configured to contact the interior surface of the conduit and to move along the interior surface,
      a device first surface approximately perpendicular to the axis of displacement, the device first surface being subject to a pressure of the actuation fluid thereby subjecting the device to displacement in the conduit,
      a first device-end shaped to receive the first end of a corresponding first part in the plurality of parts, and
      a second device-end shaped to receive the second end of a corresponding second part in the plurality of parts, the second device-end defining a recess including a bottom surface intersected by the axis of displacement, the recess being configured to center the corresponding second part in the conduit, whereby the device is positioned between the corresponding first part and the corresponding second part in the conduit,
   wherein the conduit defines grooves that facilitate passage of the actuation fluid up to the device first surface.

3. A system of displacing a plurality of parts to be stocked and distributed, each part defining a first end and a second end, the system comprising:
   a conduit, the conduit defining an interior to house an actuation fluid, an axis of displacement in the interior, and an interior surface; and
   a plurality of devices, each device including
      a periphery configured to contact the interior surface of the conduit and to move along the interior surface,
      a device first surface approximately perpendicular to the axis of displacement, the device first surface being subject to a pressure of the actuation fluid thereby subjecting the device to displacement in the conduit,
      a first device-end shaped to receive the first end of a corresponding first part in the plurality of parts, and
      a second device-end shaped to receive the second end of a corresponding second part in the plurality of parts, the second device-end defining a recess including a bottom surface intersected by the axis of displacement, the recess being configured to center the corresponding second part in the conduit,
   whereby the device is positioned between the corresponding first part and the corresponding second part in the conduit,
   wherein the device defines recesses traversing the device longitudinally in order that the actuation fluid circulating in the interior of the conduit is able to traverse the device.

4. A system in accordance with claim 3 wherein the recesses are grooves.

5. A system in accordance with claim 3 wherein the recesses are orifices.

6. A system in accordance with claim 1 wherein the first and second ends of the device have the same shape.

7. A system of displacing a plurality of parts to be stocked and distributed, each part defining a first end and a second end, the system comprising:
- a conduit, the conduit defining an interior to house an actuation fluid, an axis of displacement in the interior, and an interior surface; and
- a plurality of devices, each device including
  - a periphery configured to contact the interior surface of the conduit and to move along the interior surface,
  - a device first surface approximately perpendicular to the axis of displacement, the device first surface being subject to a pressure of the actuation fluid thereby subjecting the device to displacement in the conduit,
  - a first device-end shaped to receive the first end of a corresponding first part in the plurality of parts, and
  - a second device-end shaped to receive the second end of a corresponding second part in the plurality of parts, the second device-end defining a recess including a bottom surface intersected by the axis of displacement, the recess being configured to center the corresponding second part in the conduit, whereby the device is positioned between the corresponding first part and the corresponding second part in the conduit, wherein the recess defined by the second device-end has a first shape, and the first device-end defines a recess having a shape different from the first shape.

8. A system of displacing a plurality of parts to be stocked and distributed, each part defining a first end and a second end, the system comprising:
- a conduit, the conduit defining an interior to house an actuation fluid, an axis of displacement in the interior, and an interior surface; and
- a plurality of devices, each device including
  - a periphery configured to contact the interior surface of the conduit and to move along the interior surface,
  - a device first surface approximately perpendicular to the axis of displacement, the device first surface being subject to a pressure of the actuation fluid thereby subjecting the device to displacement in the conduit,
  - a first device-end shaped to receive the first'end of a corresponding first part in the plurality of parts, and
  - a second device-end shaped to receive the second end of a corresponding second part in the plurality of parts, the second device-end defining a recess including a bottom surface intersected by the axis of displacement, the recess being configured to center the corresponding second part in the conduit, whereby the device is positioned between the corresponding first part and the corresponding second part in the conduit, wherein the recess defined by the second device-end has a cylindrical, tapered, or pyramidal shape.

* * * * *

UNITED STATES PATENT AND TRADEMARK OFFICE
CERTIFICATE OF CORRECTION

| | | |
|---|---|---|
| PATENT NO. | : 7,972,089 B2 | Page 1 of 1 |
| APPLICATION NO. | : 11/569582 | |
| DATED | : July 5, 2011 | |
| INVENTOR(S) | : Jean-Marc Auriol and Philippe Bornes | |

It is certified that error appears in the above-identified patent and that said Letters Patent is hereby corrected as shown below:

Title page, below Item (75) should read:

--(73) Assignees: F2 C2 System, Flourens (FR);
Philippe Bornes, Flourens (FR);
Jean-Marc Auriol, Flourens (FR)--

Signed and Sealed this
Twenty-eighth Day of February, 2012

David J. Kappos
*Director of the United States Patent and Trademark Office*